(12) United States Patent
Koike et al.

(10) Patent No.: US 11,060,577 B2
(45) Date of Patent: Jul. 13, 2021

(54) FRICTION MATERIAL

(71) Applicant: ADVICS CO., LTD., Kariya (JP)

(72) Inventors: Yuta Koike, Takahama (JP); Takuo Yoshida, Toyota (JP)

(73) Assignee: ADVICS CO., LTD, Kariya (JP)

( * ) Notice: Subject to any disclaimer, the term of this patent is extended or adjusted under 35 U.S.C. 154(b) by 38 days.

(21) Appl. No.: 16/485,260

(22) PCT Filed: Mar. 15, 2018

(86) PCT No.: PCT/JP2018/010112
§ 371 (c)(1),
(2) Date: Aug. 12, 2019

(87) PCT Pub. No.: WO2018/168979
PCT Pub. Date: Sep. 20, 2018

(65) Prior Publication Data
US 2019/0376573 A1    Dec. 12, 2019

(30) Foreign Application Priority Data
Mar. 15, 2017  (JP) .............................. JP2017-050405

(51) Int. Cl.
*F16D 69/02* (2006.01)
*F16D 65/12* (2006.01)

(52) U.S. Cl.
CPC .......... *F16D 69/028* (2013.01); *F16D 65/12* (2013.01); *F16D 69/025* (2013.01); *F16D 2200/003* (2013.01); *F16D 2200/006* (2013.01); *F16D 2200/0008* (2013.01)

(58) Field of Classification Search
CPC .............................. F16D 69/025; F16D 69/028
See application file for complete search history.

(56) References Cited

U.S. PATENT DOCUMENTS

| 3,791,493 A * | 2/1974 | Yamaguchi | F16D 69/027 188/251 M |
| 3,891,595 A * | 6/1975 | Birchall | F16D 69/026 523/153 |
| 4,409,298 A | 10/1983 | Albertson et al. | |
| 2004/0241429 A1* | 12/2004 | Suzuki | F16D 69/026 428/329 |

(Continued)

FOREIGN PATENT DOCUMENTS

| CN | 104195478 A | 12/2014 |
| CN | 104265816 A | 1/2015 |

(Continued)

OTHER PUBLICATIONS

International Search Report (with English translation) and Written Opinion issued in corresponding International Patent Application No. PCT/JP2018/010112, 9 pages (dated May 22, 2018).

*Primary Examiner* — Thomas J Williams
(74) *Attorney, Agent, or Firm* — Buchanan Ingersoll & Rooney PC

(57) ABSTRACT

A friction material containing a fiber base material, a binder, an organic filler, and an inorganic filler, wherein the copper content in the friction material in terms of elemental copper is 0.5% by weight or less relative to the whole friction material, and a particulate or fibrous aluminum alloy and zinc oxide are contained as the inorganic filler.

6 Claims, 1 Drawing Sheet

(56) References Cited

U.S. PATENT DOCUMENTS

| | | | |
|---|---|---|---|
| 2015/0369321 A1* | 12/2015 | Cox | F16D 69/026 |
| | | | 188/251 A |
| 2016/0230827 A1 | 8/2016 | Kaji et al. | |
| 2016/0356332 A1* | 12/2016 | Yaguchi | C08L 61/34 |
| 2017/0016500 A1* | 1/2017 | Sin Xicola | C04B 28/006 |
| 2017/0284491 A1* | 10/2017 | Unno | F16D 69/026 |

FOREIGN PATENT DOCUMENTS

| | | | |
|---|---|---|---|
| CN | 106050992 A | 10/2016 | |
| JP | S5941380 A | 3/1984 | |
| JP | 2014148569 A | 8/2014 | |
| JP | 2015059125 A | 3/2015 | |
| JP | 2016079248 A | 5/2016 | |
| WO | 2015098434 A1 | 7/2015 | |
| WO | 2016060129 A1 | 4/2016 | |
| WO | WO-2016121748 A1 * | 8/2016 | F16D 65/092 |

* cited by examiner

| | | | EXAMPLE | | | | | | | | | | | | | | | | COMPARATIVE EXAMPLE | | |
|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 1 | 2 | 3 |
| BLEND COMPOSITION (wt%) | BINDER | PHENOLIC RESIN | 10 | 10 | 10 | 10 | 10 | 10 | 10 | 10 | 10 | 10 | 10 | 10 | 10 | 10 | 10 | 10 | 10 | 10 | 10 |
| | FIBER BASE MATERIAL | ARAMID FIBER | 5 | 5 | 5 | 5 | 5 | 5 | 5 | 5 | 5 | 5 | 5 | 5 | 5 | 5 | 5 | 5 | 5 | 5 | 5 |
| | | INORGANIC FIBER | 8 | 8 | 8 | 8 | 8 | 8 | 8 | 8 | 8 | 8 | 8 | 8 | 8 | 8 | 8 | 8 | 8 | 8 | 8 |
| | ORGANIC FILLER | CASHEW DUST | 8 | 8 | 8 | 8 | 8 | 8 | 8 | 8 | 8 | 8 | 8 | 8 | 8 | 8 | 8 | 8 | 8 | 8 | 8 |
| | | RUBBER POWDER | 1 | 1 | 1 | 1 | 1 | 1 | 1 | 1 | 1 | 1 | 1 | 1 | 1 | 1 | 1 | 1 | 1 | 1 | 1 |
| | LUBRICANT | GRAPHITE | 6 | 6 | 6 | 6 | 6 | 6 | 6 | 6 | 6 | 6 | 6 | 6 | 6 | 6 | 6 | 6 | 6 | 6 | 6 |
| | | TIN SULFIDE | 3 | 3 | 3 | 3 | 3 | 3 | 3 | 3 | 3 | 3 | 3 | 3 | 3 | 3 | 3 | 3 | 3 | 3 | 3 |
| | INORGANIC FILLER | IRON OXIDE | 10 | 10 | 10 | 10 | 10 | 10 | 1 | 2 | 5 | 15 | 15 | 5 | 10 | 10 | 10 | 1 | 15 | 15 | 15 |
| | | ZINC OXIDE | 5 | 5 | 5 | 5 | 5 | 5 | 5 | 5 | 5 | 5 | 1 | 5 | 1 | 5 | 10 | 10 | | 5 | |
| | | ALUMINUM-ZINC FIBER 65% ALUMINUM | 0.3 | | | | | | | | | | | | | | | | | | |
| | | 70% ALUMINUM | | 1 | | | | | 1 | 1 | 1 | 1 | | | 1 | 1 | 1 | | | | |
| | | 80% ALUMINUM | | | 3 | | | | | | | | 3 | | | | | | | | |
| | | 85% ALUMINUM | | | | 1 | | | | | | | | | | | | | | | |
| | | 90% ALUMINUM | | | | | 1 | | | | | | | | | | | | | | |
| | | ALUMINUM-MANGANESE FIBER 85% ALUMINUM | | | | | | 1 | | | | | | | | | | | | | 3 |
| | | CALCIUM HYDROXIDE | 3 | 3 | 3 | 3 | 3 | 3 | 3 | 3 | 3 | 3 | 3 | 3 | 3 | 3 | 3 | 3 | 3 | 3 | 3 |
| | | TITANATE SALT | 14 | 14 | 14 | 14 | 14 | 14 | 14 | 14 | 14 | 14 | 14 | 14 | 14 | 14 | 14 | 14 | 14 | 14 | 14 |
| | | ZIRCONIUM OXIDE | 8 | 8 | 8 | 8 | 8 | 8 | 8 | 8 | 8 | 8 | 8 | 8 | 8 | 8 | 8 | 8 | 8 | 8 | 8 |
| | | MICA | 5 | 5 | 5 | 5 | 5 | 5 | 5 | 5 | 5 | 5 | 5 | 5 | 5 | 5 | 5 | 5 | 5 | 5 | 5 |
| | | BARIUM SULFATE | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER | REMAINDER |
| PERFORMANCE | GENERAL EFFECT | 50kph | ○ | ○ | ○ | ○ | ○ | ○ | ○ | ○ | ○ | ○ | ○ | ○ | ○ | ○ | ○ | ○ | ○ | ○ | ○ |
| | | 100kph | ○ | ○ | ○ | ○ | ○ | ○ | ○ | ○ | ○ | ○ | ○ | ○ | ○ | ○ | ○ | ○ | ○ | ○ | ○ |
| | WEAR CHARACTERISTICS | FADING 200°C | ○ | ○ | ○ | ○ | ○ | ○ | △ | ○ | ○ | ○ | △ | △ | △ | ○ | ○ | △ | △ | ○ | ○ |
| | | 300°C | ○ | ○ | ○ | ○ | ○ | ○ | ○ | ○ | ○ | ○ | △ | △ | △ | ○ | ○ | ○ | × | ○ | ○ |
| | | 400°C | ○ | ○ | ○ | ○ | ○ | ○ | ○ | ○ | ○ | ○ | ○ | △ | ○ | ○ | ○ | ○ | × | × | × |
| | CREEPING NOISE | | ○ | ○ | ○ | ○ | ○ | ○ | ○ | ○ | ○ | ○ | ○ | ○ | ○ | ○ | ○ | ○ | ○ | × | ○ |

FRICTION MATERIAL

TECHNICAL FIELD

The present invention relates to a friction material used for a brake device or the like for vehicles.

BACKGROUND ART

The friction material used for brake pads, brake shoes of vehicles and the like is required to have various characteristics such as prevention of generation of noise such as creeping noise, high effect (high coefficient of friction), and long lifespan (wear resistance) and the like.

Conventionally, a copper component having high thermal conductivity and excellent ductility is contained in the friction material for the purpose of maintaining the coefficient of friction and imparting wear resistance. However, nowadays environmental concerns are increasing on a global scale, and development of friction materials (copper-free) with reduced copper components of high environmental load is urgently needed. Attempts have been made to construct a friction material that can reduce the generation of creeping noise without causing deterioration in the effect of braking and high temperature wear resistance at the time of high speed and high load braking accompanying the reduction of copper components.

For example, in Patent Literature 1, a friction material that contains relative to the whole friction material raw material 1 to 10 wt % of one or more types selected from aluminum particles, aluminum fibers, alloy particles having aluminum as a main component, and an alloy fiber having aluminum as a main component as an inorganic friction modifier, and contains relative to the whole friction material raw material 5 to 20 wt % of hard inorganic particles having an average particle size of 1 to 20 μm and Mohs hardness of greater than or equal to 4.5 to improve the effect of braking and wear resistance at the time of high speed and high load braking that reduce by reduction in copper components. In addition, as an alloy containing aluminum as a main component, 90 wt % or more of aluminum is contained. Patent Literature 1 is a technology that utilizes the characteristic that adhesive wear of the aluminum occurs only at the time of high speed load braking.

Moreover, in order to compensate for the deterioration of the wear resistance due to the reduction of the copper component, a friction material containing a large amount of potassium titanate (e.g., 10 to 40 wt %) has been proposed, but it is known that while excellent in wear resistance at high temperature, formation of adhesion film on a mating material (e.g., rotor) increases, and the stick-slip phenomenon increases accordingly, leading to generation of creeping noise if the potassium titanate is contained in a large amount.

Therefore, in Patent Literature 2, a friction material containing triiron tetraoxide ($Fe_3O_4$) having an average particle size of 0.1 to 1.0 μm in addition to potassium titanate having a plurality of convex shapes is reported as a friction material that can achieve both wear resistance at high temperatures and reduction of the generation of creeping noise even in a composition that does not substantially contain a copper component. The small particles of the triiron tetraoxide have an effect of reducing the stick-slip phenomenon caused by potassium titanate by appropriately cleaning the film excessively formed on the friction interface between the friction material and the rotor, which is a technology for reducing the generation of creeping noise.

CITATIONS LIST

Patent Literatures

Patent Literature 1: Japanese Unexamined Patent Application Publication No. 2015-59125
Patent Literature 2: Japanese Unexamined Patent Application Publication No. 2016-79248

SUMMARY OF INVENTION

Technical Problems

However, although the technology of Patent Literature 1 compensates the deterioration of the friction characteristics at the time of high temperature and high speed load due to the reduction of the copper component by the aluminum-based material, the conventional aluminum-based material is softer and lower in strength than copper, and thus the adhesion force with the rotor which is the mating material tends to become too strong. Therefore, there is a problem that the wear of the friction material easily progresses, and hence the reduction of the brake effect cannot be avoided.

In the technology of Patent Literature 2, the rotor surface is appropriately cleaned by scraping off the adhesion film with the iron oxide. However, in the technology of Patent Literature 2, since the average particle size of triiron tetraoxide is 0.1 to 1.0 μm, the film cleaning effect by triiron tetraoxide cannot be exhibited with such an average particle size, and the generation of the creeping noise may not be effectively reduced.

Therefore, the present invention provides a friction material capable of securing excellent wear resistance and reducing creeping noise generated at the time of creep phenomenon without causing a reduction in the effect of braking at the time of high speed and high load braking.

Solutions to Problems

The present inventors have intensively studied to solve the above-mentioned problems, and found that by containing particulate or fibrous aluminum alloy and zinc oxide in the friction material, the unpleasant noise of low frequency called the creeping noise generated at the time of creep phenomenon can be effectively reduced without causing reduction in the effect of braking at the time of high speed and high load braking, and furthermore, while securing excellent wear resistance. Furthermore, the inventors found that by incorporating iron oxide in the friction material, the brake effect, particularly the fade resistance, at the time of a high speed and high load braking can be enhanced, and came to complete the present invention.

In other words, the present invention has the following characteristic configurations.

A friction material containing a fiber base material, a binder, an organic filler, and an inorganic filler, where
in the friction material, a content of copper as an element is less than or equal to 0.5 wt % relative to the whole friction material, and
a particulate or fibrous aluminum alloy and zinc oxide are contained as the inorganic filler.

According to the friction material described above, unpleasant noise of low frequency called creeping noise generated at the time of creep phenomenon can be reduced while securing excellent wear resistance without causing lowering in the effect of braking at the time of the high speed and high load braking. Conventionally, the generation of creeping noise has been a problem in the friction material containing a large amount of titanate salt such as potassium titanate to compensate for the deterioration of wear resistance due to the reduction of the copper component. According to the present configuration, by containing particulate or fibrous aluminum alloy in the friction material, an appropriate adhesion property is expressed between the friction surfaces of the friction material and the mating material, and the creeping noise can be effectively reduced. At the same time, by containing zinc oxide in the friction material, the zinc oxide can contribute to the decomposition of the resin component in the friction material, provide an appropriate lubricity to the friction material under high temperature conditions, and secure wear resistance under high temperature conditions. Therefore, a friction material having excellent effect of braking and wear resistance at the time of high speed and high load braking, and characteristics for reducing the generation creeping noise can be formed.

BRIEF DESCRIPTION OF DRAWING

FIG. 1 is a view summarizing a blend composition of a friction material raw material and the performance evaluation thereof according to an example and a comparative example of a friction material in accordance with the present embodiment.

DESCRIPTION OF EMBODIMENT

Hereinafter, although an embodiment of the present invention is described in detail, the present invention is not limited by the following embodiment to an extent not exceeding its purpose.

A friction material according to the present embodiment contains a fiber base material, a binder, an organic filler, an inorganic filler and the like to be described later, and furthermore contains, as an inorganic filler, a particulate or fibrous aluminum alloy, and zinc oxide. In addition to these, materials generally used in producing the friction material can also be contained. Here, all the materials mixed in producing the friction material according to the present embodiment are referred to as a friction material raw material.

The friction material according to the present embodiment is a non-asbestos friction material (NAO material). Furthermore, the friction material according to the present embodiment does not substantially contain a copper component having a high environmental load (copper free). Specifically, the copper component is not contained, or even when contained, it is less than or equal to 0.5 wt % relative to the whole friction material raw material.

Conventionally, the generation of the creeping noise has been a problem in the friction material containing a large amount of titanate salt such as potassium titanate in order to compensate for the deterioration of the wear resistance due to the reduction of the copper component. The friction material according to the present embodiment can achieve both excellent wear resistance and reduction in the generation of the creeping noise while containing a large amount of titanate salt such as a substitute for copper component by containing particulate or fibrous aluminum alloy and zinc oxide. Therefore, the friction material according to the present embodiment sufficiently responds to the movement of copper free.

The fiber base material can be exemplified by organic fibers, metal fibers, natural or man-made inorganic fibers, and the like. Specific examples of the fiber base material include aromatic polyamide fibers (aramid fibers), acrylic fibers, cellulose fibers, and carbon fibers as organic fibers, single metals such as steel, stainless steel, aluminum, zinc and tin as well as fibers made of respective alloy metals as metal fibers, and rock wool and glass fibers as inorganic fibers. The fiber base material may be used alone or in combination of two or more types. Furthermore, the content of the fiber base material is not particularly limited, but it can be contained preferably in an amount of 3 to 15 wt % relative to the whole friction material raw material.

The binder has a function of binding the friction material raw materials. Specific examples of the binder include phenolic resin, epoxy resin, melamine resin, and imide resin, and modified resins thereof such as elastomer, hydrocarbon resin, and epoxy can also be used. A binder can also be used alone or in combination of two or more types. Furthermore, the content of the binder is not particularly limited, but it can be contained preferably in an amount of 3 to 10 wt % relative to the whole friction material raw material.

The organic filler can contain cashew dust, rubber powder, tire powder, fluoropolymer and the like, which can be used alone or in combination of two or more types. However, the present invention is not limited to the specific examples described above, and organic fillers known in the technical art can be preferably used. The content of the organic filler is also not particularly limited, and may be a content generally used in the art.

As the inorganic filler, particulate or fibrous aluminum alloy and zinc oxide are contained.

The particulate or fibrous aluminum alloy is contained mainly to give the friction material a function of reducing the generation of creeping noise. By containing particulate or fibrous aluminum alloy in the friction material, an appropriate adhesion property is expressed between the friction surfaces of the friction material and the mating material, and the creeping noise can be effectively reduced. An aluminum alloy is an alloy containing aluminum as a main component, and is obtained by adding other elements to aluminum. Characteristics such as strength and hardness of aluminum can be improved by using aluminum as an alloy. The aluminum component in the aluminum alloy is preferably 70 to 85 wt %. By adjusting to this range, an appropriate adhesion property can be exhibited without lowering the melting point of the aluminum alloy.

The aluminum alloy is not particularly limited as long as the above function can be exhibited, and known aluminum alloys used in the art can be used. For example, an alloy of aluminum and one or more elements selected from other elements such as zinc, manganese, magnesium, silicon, iron, titanium, chromium and molybdenum can be mentioned. Specific examples thereof include aluminum-zinc alloy, aluminum-manganese alloy, aluminum-magnesium alloy, aluminum-zinc-magnesium alloy, aluminum-silicon alloy, and aluminum-zinc alloy or aluminum-manganese alloy is preferably adopted.

The size of the particulate or fibrous aluminum alloy is not particularly limited as long as it can exhibit the function described above and can be uniformly mixed with other friction material raw materials, and that of a known size used in the art can be used. For example, the average particle size of aluminum alloy particles is preferably 50 to 300 μm the average fiber diameter of aluminum fibers is preferably 20 to 100 μm, and the average fiber length is preferably 0.5 to 10 mm.

The content of the particulate or fibrous aluminum alloy is preferably 0.3 to 3 wt % relative to the whole friction material raw material. When the particulate or fibrous aluminum alloy is contained in an amount of more than 3 wt %, it may excessively adhere to the mating material between the friction surfaces due to the frictional heat and the progress of wear tends to become significant, which is not preferable from the viewpoint of high temperature wear resistance. On the other hand, when the content is less than 0.3 wt %, the effect of reducing the generation of creeping noise described above cannot be expected, and thus the content is preferable in the above range.

The zinc oxide is contained mainly to provide the friction material with a wear resistance function under high temperature. Since by containing zinc oxide in the friction material, the zinc oxide contributes to the decomposition of the resin component in the friction material, and hence an appropriate lubricity can be provided to the friction material under high temperature conditions, and particularly wear resistance under high temperature conditions can be secured.

The property and size of the zinc oxide are not particularly limited as long as it can be uniformly mixed with other friction material raw materials and the above functions can be effectively exhibited, and powder, particle, and fiber forms can be used. Furthermore, the content of zinc oxide is preferably 1 to 10 wt % relative to the whole friction material raw material, and the wear resistance function can be effectively exhibited by adjusting the content to this range. When the content of zinc oxide becomes less than 1 wt %, wear resistance at the time of high temperature cannot be exhibited, and when the content becomes larger than 10 wt %, fade resistance is deteriorated.

As an inorganic filler, in addition to the particulate or fibrous aluminum alloy and zinc oxide, iron oxide can also be contained. The iron oxide is contained mainly to provide the friction material with a function for improving the effect of braking. As the iron oxide is reduced by high temperature friction, the appropriate adhesion property is expressed between the friction surfaces of the friction material and the mating material and the effect of braking is improved, and in particular, the fade resistance can be improved.

As iron oxide, any of ferric oxide: $Fe_2O_3$ and triiron tetraoxide: $Fe_3O_4$ can be used.

The property and size of the iron oxide are not particularly limited as long as it can be uniformly mixed with other friction material raw materials and the above functions can be effectively exhibited, and powder, particle, and fiber forms can be used. Furthermore, the content of iron oxide is preferably 1 to 15 wt % relative to the whole friction material raw material, and the effect of braking, in particular, the fade resistance can be effectively improved by adjusting the content to such range. When the content of iron oxide becomes less than 1 wt %, fade resistance is deteriorated, and when the content becomes larger than 15 wt %, wear resistance at the time of high temperature is deteriorated.

The inorganic filler includes, in addition to particulate or fibrous aluminum alloy, zinc oxide and iron oxide, pH modifier, inorganic friction modifier, titanate salt, calcium carbonate, magnesium carbonate, barium sulfate, mica, talc, calcium silicate and the like. Examples of titanate salt includes titanic acid alkali metal salt and titanic acid alkali metal/group II salt, and specific examples thereof include potassium titanate, sodium titanate, lithium titanate, lithium potassium titanate, and magnesium potassium titanate. The titanate salt is preferably contained in an amount of 10 to 30 wt % relative to the whole friction material raw material. This can compensate for the deterioration of the wear resistance due to the reduction of the copper component.

Furthermore, calcium hydroxide and the like can be contained as a pH modifier.

As inorganic friction modifier, silica such as silicon dioxide, zirconium silicate, zirconium oxide (zirconia), magnesium oxide, aluminum oxide (alumina), chromium oxide (chromium oxide (II) etc.), ceramic powder and the like can be contained. Preferably, a substance having a Mohs hardness of greater than or equal to 6.5 can be used as the inorganic friction modifier, and an inorganic substance known in the art can be preferably used without being limited to the specific examples described above.

Furthermore, a metal including a single metal such as iron, aluminum, zinc and tin, a metal powder of the respective alloy metal, and the like can be contained.

These inorganic fillers may be used alone or in combination of two or more types. The content of the inorganic filler is also not particularly limited, and may be a content generally used in the art.

Furthermore, a lubricant can be contained in the friction material of the present embodiment, and specific examples thereof include coke, black lead, carbon black, graphite, metal sulfide. Examples of metal sulfides include tin sulfide, antimony trisulfide, molybdenum disulfide, tungsten sulfide. The lubricant may be used alone or in combination of two or more types. The content of the lubricant is also not particularly limited, and may be a content generally used in the art.

The friction material of the present embodiment can be manufactured through a method known in the art, and can be manufactured by a mixing process of blending and mixing the friction material raw material and a molding process of molding the mixed friction material raw material into a desired shape.

Here, in the mixing process, it is preferable to mix the friction material in powder form, so that it becomes easy to uniformly mix the friction material raw material. The mixing method is not particularly limited as long as the friction material raw material can be uniformly mixed, and the mixing can be carried out through methods known in the art. Preferably, mixing can be performed using a mixer such as a Henschel mixer or a Loedige mixer, and for example, mixing is performed for about 10 minutes at normal temperature. At this time, the friction material raw material may be mixed while being cooled through a known cooling method so that the temperature of the mixture does not rise.

The molding process can be performed by pressing and solidifying the friction material raw material with a press or the like, and can be performed based on methods known in the art. When performing molding with a press, the molding may be performed through either a hot press method in which the friction material raw material is molded by being heated, pressed and solidified, or a normal temperature press method in which the friction material raw material is molded by being pressed and solidified at normal temperature without being heated. In the case where the molding is performed by the hot press method, for example, the molding temperature is 140° C. to 200° C. (preferably 160° C.), the molding pressure is 10 MPa to 30 MPa (preferably 20 MPa), and the molding time is 3 minutes to 15 minutes (preferably 10 minutes). In the case where the molding is performed by the normal temperature press method, for example, molding can be performed by setting the molding pressure to 50 MPa to 200 MPa (preferably 100 MPa) and the molding time to 5 seconds to 60 seconds (preferably 15 seconds). Subsequently, clamp processing (e.g., 180° C., 1 MPa, 10 minutes)

is performed. Thereafter, heat treatment (preferably 230° C., 3 hours) can be performed at 150° C. to 250° C. for 5 minutes to 180 minutes.

Furthermore, a polishing process may be provided to polish the surface of the friction material to form a friction surface, if necessary.

The friction material according to the present embodiment can be applied to a disc brake pad of a vehicle or the like, but is not limited thereto, and can be applied to any object to which a friction material known in the art such as a brake shoe can be applied. For example, the friction material according to the present embodiment can be integrated with a plate-like member such as a metal plate serving as a back plate and used as a brake pad.

According to the friction material of the present embodiment, by containing particulate or fibrous aluminum alloy and zinc oxide, unpleasant noise of low frequency called creeping noise generated at the time of creep phenomenon can be reduced while securing excellent wear resistance without causing lowering in the effect of braking at the time of the high speed and high load braking. Conventionally, the generation of creeping noise has been a problem in the friction material containing a large amount of titanate salt such as potassium titanate to compensate for the deterioration of wear resistance due to the reduction of the copper component. According to the present configuration, inclusion of the particulate or fibrous aluminum alloy into the friction material can cause an appropriate adhesion property to be expressed between the friction surfaces of the friction material and the mating material and the creeping noise to be effectively reduced, and the inclusion of zinc oxide can contribute to the decomposition of the resin component in the friction material. Therefore, the friction material that can provide appropriate lubricity to the friction material under high temperature conditions, ensure wear resistance under high temperature conditions, and has characteristics of providing excellent effect of braking and wear resistance at the time of high speed and high load braking and reducing generation of creeping noise can be formed.

Furthermore, by including iron oxide in addition to the particulate or fibrous aluminum alloy and the zinc oxide in the friction material of the present embodiment, the friction material that can enhance the effect of braking, particularly the fade resistance, and in which characteristics such as the effect of braking and the wear resistance at the time of high speed and high load braking, and the reduction in the generation of creeping noise are further enhanced can be formed.

EXAMPLES

Examples of the friction material according to the present embodiment will be described below, but the present invention is not limited to these examples.

In Examples 1 to 16 and Comparative Examples 1 to 3, the friction material prepared by blending the friction material raw material according to the blending amount shown in FIG. 1 was used as a brake pad, and evaluations on general effect, wear resistance and creeping noise were performed. The unit of blending amount in the composition of each friction material raw material in the figure is wt % relative to the whole friction material raw material.
(General Effect)

The average friction number (μ) and the fade friction coefficient (μ) at an initial velocity of 50 km/h and 100 km/h of the second efficacy test were measured according to JASO C406.

Here, the average friction number at an initial velocity of 50 km/h and 100 km/h of the second efficacy test was evaluated in three stages according to the following criteria.

○: Average friction coefficient greater than or equal to 0.37 and less than or equal to 0.43

Δ: Average friction coefficient greater than or equal to 0.34 and less than 0.37 or greater than 0.43 and less than 0.46 x: Average friction coefficient less than 0.34 or greater than 0.46

The fade friction coefficient was evaluated in three stages according to the following criteria.

○: Fade friction coefficient greater than or equal to 0.3

Δ: Fade friction coefficient greater than or equal to 0.2 and less than 0.3 x: Fade friction coefficient less than 0.2
(Wear Resistance)

The wear test was performed at each temperature of 200° C., 300° C., and 400° C. according to JASO C427, the thickness (mm) of the friction material was measured, and the wear amount was calculated. It was converted to the wear amount per 1000 braking times, and evaluated in four stages according to the following criteria.

⊙: less than 0.20 mm

○: greater than or equal to 0.20 mm and less than 0.25 mm

Δ: greater than or equal to 0.25 mm and less than 0.30 mm x: greater than or equal to 0.30 mm
(Creeping Noise)

After using the actual vehicle and performing JASO C406 equivalent fitting, it was left outdoors overnight, the brake pedal was released immediately after starting the engine the next morning, and in-vehicle noise of the generated creeping noise was evaluated. Here, the evaluation was made in two stages according to the following criteria.

○: No generation of noise or generation of noise at an acceptable level that a general driver does not feel uncomfortable x: Generation of noise at a level that the general driver feels uncomfortable The results are shown in FIG. 1. In Examples 1 to 16, good results were obtained for the general effect, the wear resistance and the creeping noise. Thus, it was found that the friction material of the present example can effectively reduce the generation of the creeping noise while securing the satisfactory brake effect and the wear resistance of the friction material. On the other hand, in Comparative Example 1 in which the aluminum alloy and zinc oxide are not contained, the high temperature wear resistance is lowered, the generation of creeping noise cannot be reduced, and there are problems in the wear resistance and the generation of creeping noise. It was found that in Comparative Example 2 in which the zinc oxide is contained but the aluminum alloy is not contained, the generation of creeping noise cannot be reduced, and in Comparative Example 3 in which the aluminum alloy is contained but the zinc oxide is not contained, the high temperature wear resistance is lowered. From these results, it has been confirmed that it is necessary to contain both the aluminum alloy and the zinc oxide in order to provide a friction material that satisfies all of the brake effect, the wear resistance and the creeping noise.

The detailed experimental results are omitted here, but in a case where only 0.1 wt % of aluminum-zinc alloy fiber, in which aluminum component is 80%, was contained relative to the whole friction material raw material, it was satisfactory from the viewpoint of brake effect and wear resistance but a slight lowering in the effect of reducing the generation of creeping noise was confirmed. In a case where the aluminum alloy was contained by 5 wt %, it was satisfactory from the viewpoint of the brake effect and the effect of reducing the generation of creeping noise, but a slight decrease in the wear resistance at high temperature (400° C.) was confirmed. Furthermore, in a case where an aluminum-zinc alloy fiber in which an aluminum component is 65% was used and even in a case where an aluminum-zinc alloy fiber in which an aluminum component is 90% was used, a slight decrease in the wear resistance at high temperature (400° C.) was confirmed. Therefore, it was found that by optimizing the content of the aluminum alloy relative to the whole friction material and the content of the aluminum component in the aluminum alloy, a friction material having a more excellent brake effect, wear resistance and effect for reducing the generation of creeping noise can be provided.

Furthermore, in a case where the zinc oxide was contained in an amount of 15 wt % relative to the whole friction material raw material, it was satisfactory from the viewpoint of the wear resistance and the effect of reducing the generation of creeping noise, but a slight decrease in the brake effect at the time of fading was confirmed. Therefore, it was found that by optimizing the content of zinc oxide relative to the whole friction material, a friction material having more excellent brake effect, wear resistance, and effect for reducing the generation of creeping noise can be provided.

In a case where iron oxide was not contained, good results were obtained for the wear resistance and the creeping noise, but a slight decrease in brake effect at the time of fading was confirmed. Thus, it was found that by including iron oxide, a friction material having better brake effect, wear resistance, and characteristics for reducing the generation of creeping noise can be provided. On the other hand, in a case where the iron oxide was contained by 20 wt % relative to the whole friction material raw material, it was satisfactory from the viewpoint of the brake effect and the effect of reducing the generation of creeping noise, but a slight decrease in the wear resistance at high temperature (300° C. and 400° C.) was confirmed. From these results, it was found that in a case where iron oxide is included, by optimizing the content of the iron oxide, a friction material having a more excellent brake effect, wear resistance, and effect of reducing the generation of creeping noise can be provided.

The invention claimed is:

1. A friction material comprising:
a fiber base material;
a binder;
an organic filler; and
an inorganic filler,
wherein in the friction material,
a content of copper as an element is less than or equal to 0.5 wt % relative to the whole friction material, and
a particulate or fibrous aluminum alloy and zinc oxide are contained as the inorganic filler, and
a content of the aluminum alloy is 0.3 to 3.0 wt % relative to the whole friction material, and
a content of the zinc oxide is 1 to 10 wt % relative to the whole friction material, and
the content of the zinc oxide is higher than the content of the aluminum alloy.

2. The friction material according to claim 1, wherein the aluminum alloy contains 70 to 85 wt % of an aluminum component.

3. The friction material according to claim 2, wherein iron oxide is contained as the inorganic filler.

4. The friction material according to claim 3, wherein a content of the iron oxide is 1 to 15 wt % relative to the whole friction material.

5. The friction material according to claim 1, wherein iron oxide is contained as the inorganic filler.

6. The friction material according to claim 5, wherein a content of the iron oxide is 1 to 15 wt % relative to the whole friction material.

* * * * *